United States Patent
Lu et al.

(10) Patent No.: US 11,378,520 B2
(45) Date of Patent: Jul. 5, 2022

(54) AUTO FOCUS FUNCTION FOR VISION INSPECTION SYSTEM

(71) Applicants: TE Connectivity Services GmbH, Schaffhausen (CH); Tyco Electronics (Shanghai) Co., Ltd., Shanghai (CN)

(72) Inventors: Roberto Francisco-Yi Lu, Bellevue, WA (US); Sonny O. Osunkwo, Harrisburg, PA (US); Lei Zhou, Shanghai (CN); Scott Day, Jacobus, PA (US); Jeffrey Zerbe, Bressler, PA (US)

(73) Assignee: TE Connectivity Services GmbH

( * ) Notice: Subject to any disclaimer, the term of this patent is extended or adjusted under 35 U.S.C. 154(b) by 0 days.

(21) Appl. No.: 16/853,338

(22) Filed: Apr. 20, 2020

(65) Prior Publication Data
US 2021/0318251 A1   Oct. 14, 2021

(51) Int. Cl.
| | | |
|---|---|---|
| *G03F 7/20* | (2006.01) | |
| *G01N 21/88* | (2006.01) | |
| *G01N 21/892* | (2006.01) | |
| *G01N 21/17* | (2006.01) | |

(52) U.S. Cl.
CPC ..... *G01N 21/8803* (2013.01); *G01N 21/8806* (2013.01); *G01N 21/892* (2013.01); *G01N 2021/1765* (2013.01)

(58) Field of Classification Search
CPC .......... G01N 21/8803; G01N 21/8806; G01N 21/892; G01N 2021/1765; G01N 2021/8883; G01N 2021/8887; H01J 37/28; H01J 37/16; B07C 2501/0063; B07C 5/342; B07C 5/36; H04N 7/18; H04N 5/232123
See application file for complete search history.

(56) References Cited

U.S. PATENT DOCUMENTS

| | | | |
|---|---|---|---|
| 9,997,331 B1* | 6/2018 | Own | H01J 37/16 |
| 2008/0037860 A1* | 2/2008 | Yamashita | G06K 9/32 |
| | | | 382/149 |
| 2008/0073524 A1* | 3/2008 | Nishiyama | G02B 21/0016 |
| | | | 250/307 |

\* cited by examiner

*Primary Examiner* — Mesfin T Asfaw

(57) ABSTRACT

A vision inspection system includes a platform supporting parts for inspection at an inspection zone, an inspection station positioned adjacent the platform at the inspection zone including an imaging device to image the parts in a field of view above the upper surface, and a vision inspection controller receiving images from the imaging device. The vision inspection controller includes an auto focus module for orienting the imaging device relative to the inspection zone. The auto focus module determines a working distance for the imaging device from the inspection zone. The auto focus module calculates an image contrast score of pixel values of the images at various working distances from the inspection zone. The vision inspection controller causes the inspection station to operate the imaging device at an imaging working distance corresponding to the working distance associated with the highest image contrast score.

20 Claims, 4 Drawing Sheets

AUTO FOCUS FUNCTION FOR VISION INSPECTION SYSTEM

CROSS REFERENCE TO RELATED APPLICATIONS

This application claims benefit to Chinese Application No. 202010265772.3, filed Apr. 7, 2020, the subject matter of which is herein incorporated by reference in its entirety.

BACKGROUND OF THE INVENTION

The subject matter herein relates generally to vision inspection systems.

Inspection systems are used for inspecting parts during a manufacturing process. Conventional inspection systems use personnel to manually inspect parts as the parts move along a conveyor. Defective parts are removed from the conveyor. Such manual inspection systems are labor intensive and high cost. The manual inspection systems have low detection accuracy leading to poor product consistency. Additionally, manual inspection systems suffer from human error due to fatigue, such as missed defects, wrong counts, misplacing of parts, and the like.

Some known inspection systems use machine vision for inspecting parts. The machine vision inspection systems use cameras to image the parts. The images are processed to detect defects with the parts. Capturing quality images is important for analysis during inspection and training during machine learning. Image quality may be affected by the distance of the imaging device from the part.

A need remains for a vision inspection system that may be operated in a cost effective and reliable manner.

BRIEF DESCRIPTION OF THE INVENTION

In an embodiment, a vision inspection system is provided including a platform supporting parts for inspection at an inspection zone, an inspection station positioned adjacent the platform at the inspection zone including an imaging device to image the parts on the platform, and a vision inspection controller receiving images from the imaging device. The vision inspection controller includes an auto focus module for orienting the imaging device relative to the inspection zone. The auto focus module determines a working distance for the imaging device from the inspection zone. The auto focus module calculates an image contrast score of pixel values of the images at various working distances from the inspection zone. The vision inspection controller causes the inspection station to operate the imaging device at an imaging working distance corresponding to the working distance associated with the highest image contrast score.

In an embodiment, a vision imaging system is provided including a platform supporting parts for inspection at an inspection zone, an inspection station positioned adjacent the platform including an imaging device to image the parts in a field of view above the upper surface, and a vision inspection controller receiving images from the imaging device. The vision inspection controller includes an auto focus module for orienting the imaging device relative to the inspection zone. The auto focus module includes one or more processors configured to move the imaging device to a first working distance from the inspection zone, one or more processors configured to capture a first image at the first working distance, and one or more processors configured to calculate a first image contrast score of pixel values of the first image. The auto focus module includes one or more processors configured to move the imaging device to a second working distance from the inspection zone, one or more processors configured to capture a second image at the second working distance, and one or more processors configured to calculate a second image contrast score of pixel values of the second image. The auto focus module includes one or more processors configured to compare the first image contrast score and the second image contrast score to determine which has a higher image contrast score. The inspection station operates the imaging device at an imaging working distance equal to the working distance associated with the higher image contrast score to image the parts.

In an embodiment, a method of inspecting parts is provided including moving an imaging device to a first working distance from an inspection zone, capturing a first image at the first working distance, and calculating a first image contrast score of pixel values of the first image. The method includes moving the imaging device to a second working distance from the inspection zone, capturing a second image at the second working distance, and calculating a second image contrast score of pixel values of the second image. The method includes comparing the first image contrast score and the second image contrast score to determine which has a higher image contrast score value. The method includes operating the imaging device at an imaging working distance equal to the working distance associated with the higher image contrast score value to image the parts.

DETAILED DESCRIPTION OF THE INVENTION

Figure 1:
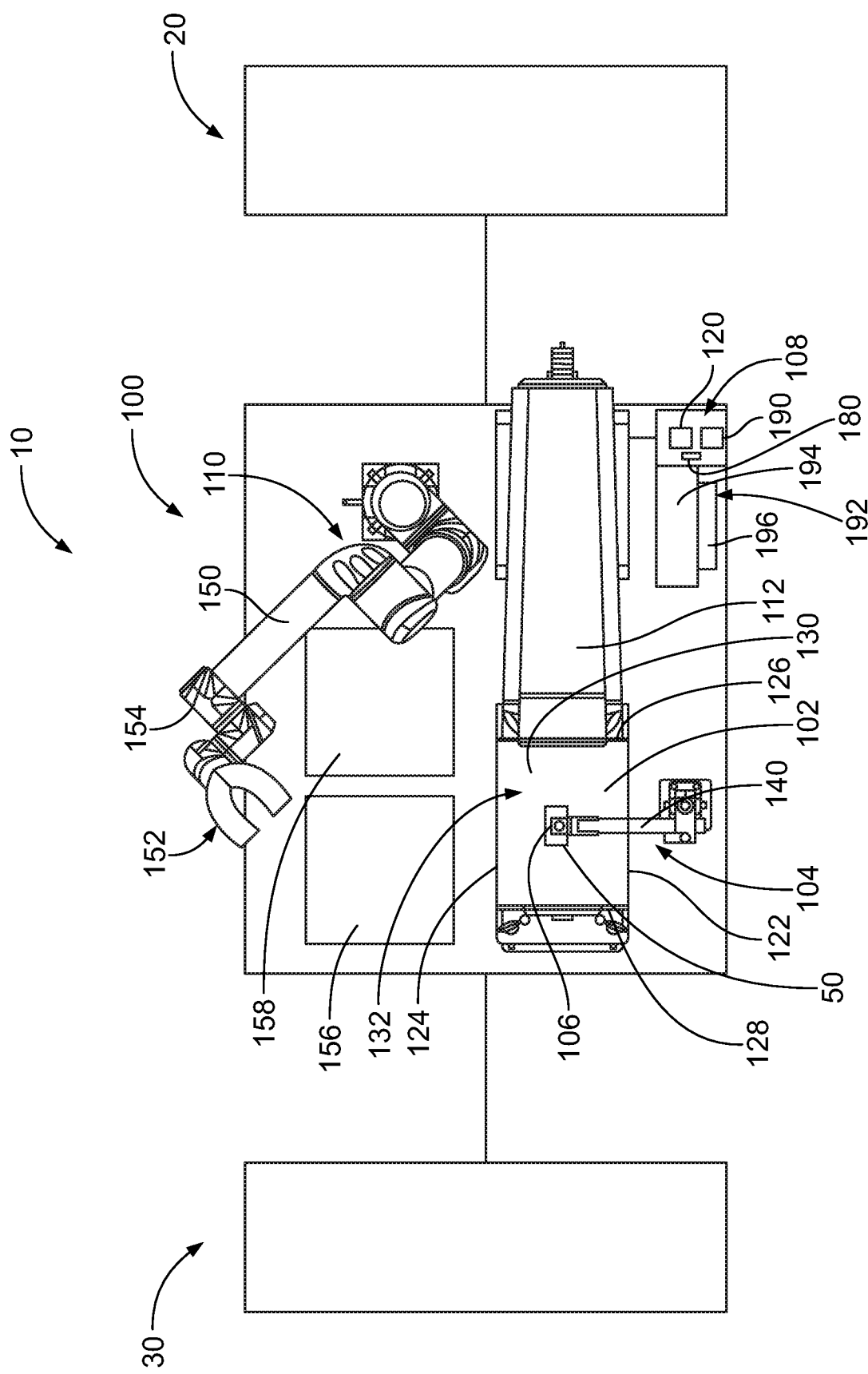
FIG. 1 is a schematic illustration of a machine 10 for manufacturing parts 50, such as parts used in electrical connectors.

FIG. 1 is a schematic illustration of a machine 10 for manufacturing parts 50, such as parts used in electrical connectors. For example, the parts 50 may be contacts, housings, circuit boards, or other types of parts. The machine 10 may be used for manufacturing parts used in other industries. The machine 10 includes one or more forming machines 20 used to form various parts 50. For example, the forming machines 20 may include a molding machine, a press, a lathe, and the like. The machine 10 includes a vision inspection system 100 used to inspect the various parts 50. The machine 10 includes one or more processing machines 30 used for processing the various parts 50. For example, the processing machines 30 may include assembly machines, packaging machines, and the like. For example, in various embodiments, the parts 50 may be assembled, such as at an assembly station, prior to packaging, such as at a packing station. The parts 50 are transported between the forming machines 20 and the vision inspection system 100. The vision inspection system 100 is used for quality inspection of the parts 50 and removes defective parts for scrap or further inspection. The acceptable parts 50 that have passed inspection by the vision inspection system 100 are transported between the vision inspection system 100 and the processing machines 30.

The vision inspection system 100 includes a platform 102 that supports the parts 50 through the vision inspection system 100. The parts 50 may be sorted on the platform 102. For example, defective parts and/or acceptable parts may be removed from the platform 102 and placed in bins or containers or moved to another station, such as to the processing machines 30. The platform 102 may be used to feed or move the parts 50 through the vision inspection system 100. In various embodiments, the platform 102 may support the parts without the need for fixturing, which increases the throughput of the parts 50 through the vision inspection system 100.

The vision inspection system 100 includes an inspection station 104 having one or more imaging devices 106 that image the parts 50 on the platform 102 within a field of view of the imaging device(s) 106 at an inspection zone (for example, an upper surface of the platform 102). The vision inspection system 100 includes a vision inspection controller 108 that receives the images from the imaging device 106 and processes the images. For example, the vision inspection controller 108 may be used to determine inspection results. The vision inspection controller 108 determines if each part 50 passes or fails inspection. The vision inspection controller 108 may reject parts 50 that are defective. In an exemplary embodiment, the vision inspection controller 108 includes an artificial intelligence (AI) learning module used to update image analysis based on the images received from the imaging device 106. The vision inspection controller 108 may be updated and trained in real time during operation of the vision inspection system 100.

In an exemplary embodiment, the vision inspection controller 108 includes an auto focus module 120 for orienting the imaging device relative to the inspection zone. The auto focus module 120 determines an imaging working distance for the imaging device 106 from the inspection zone for achieving enhanced images. For example, the auto focus module 120 determines the working distance that provides the sharpest images of the parts 50 within the inspection zone. The auto focus module 120 may be trained during a calibration process by imaging at various working distances, processing each of the images, and selecting the operating working distance that corresponds to the working distance associated with the sharpest image. In an exemplary embodiment, the auto focus module 120 calculates an image contrast score of pixel values of the images at the various working distances to determine the working distance associated with the highest image contrast score. The higher image contrast corresponds to images having higher transition in the pixel values. The higher transition in pixel values are typical of sharp, high quality images. The images with higher transition, and higher image contrast scores are clearer images. The images with lower transition, and lower image contrast scores are blurrier images. In an exemplary embodiment, the calibration process may be performed automatically to determine the optimum working distance for the imaging device 106.

The vision inspection system 100 includes a sorting device 110 for sorting the parts 50 based on the inspection results. For example, the sorting device 110 may separate the acceptable parts from the defective parts. The sorting device 110 may be multi-axis robot manipulator configured to grip and pick the parts off of the platform 102. In other various embodiments, the sorting device 110 may include a pusher or ejector configured to push the acceptable and/or the defective parts off of the platform 102.

In an exemplary embodiment, the vision inspection system 100 may be used to inspect different types of parts 50. For example, the vision inspection system 100 may be used to inspect different sized parts, different shaped parts, parts in different orientations, and the like. The auto focus module 120 may be calibrated for each of the different types of parts 50 to determine different working distances for the different types of parts 50.

In an exemplary embodiment, the vision inspection system 100 includes a part feeding device 112. The parts 50 are loaded onto the platform 102 by the part feeding device 112, which may include a hopper, a conveyor, or another type of feeding device. The parts 50 are presented to the inspection station 104 on the platform 102. The parts 50 may be advanced or fed along the platform 102 to or through the inspection station 104 for inspection of the parts 50. The parts 50 are removed from the platform 102 by the sorting device 110. The parts 50 may be guided to a particular location of the platform 102, such as proximate to a center of the platform 102 between a first side 122 and a second side 124 of the platform 102. The parts 50 may be loaded onto the platform 102, such as proximate to a rear 126 of the platform 102, and advanced forward by or on the platform 102 toward the front 128 of the platform 102. Other types of part feeding devices 112 may be provided in alternative embodiments. The platform 102 includes a plate 130 having an upper surface 132 used to support the parts 50. The plate 130 may be a vibration tray that is vibrated to advance the parts 50 from the rear 126 toward the front 128. The plate 130 may be rectangular. However, the plate 130 may have other shapes in alternative embodiments.

The imaging device 106 is located relative to an inspection zone for the parts 50 to view and image the parts 50. For example, the imaging device 106 may be located above the upper surface 132 and views the parts 50 arranged on the upper surface 132 at an inspection zone (for example, directly below the imaging device 106). The imaging device 106 may be located at other locations, such as along a side of the plate 130, below the plate 130 viewing through the plate 130 (for example, using a clear plate), or at another location. Optionally, multiple imaging devices 106 may be used viewing the parts 50 from different sides or for viewing different areas of the plate 130. The imaging device 106 may be a camera, such as a visible light camera. The field of view of the imaging device 106 may be approximately centered between first and second sides 122, 124 of the platform 102. The field of view of the imaging device 106 may be approximately centered between the rear 126 and the front 128 of the platform 102. The imaging distance of the imaging device 106 above the inspection zone affects the image quality. For example, if the imaging device 106 is too close to the inspection zone, the image may be unclear. If the imaging device 106 is too far from the inspection zone, the image may be unclear. When the imaging device 106 is located at the proper imaging distance, the image is clear. In an exemplary embodiment, the auto focus module 120 of the vision inspection controller is used to determine the proper imaging distance for the imaging device 106 for achieving enhanced, clear images.

In an exemplary embodiment, the imaging device 106 is mounted to a position manipulator 140 for moving the imaging device 106 relative to the platform 102. The position manipulator 140 may be an arm or a bracket that supports the imaging device 106. In various embodiments, the position manipulator 140 may be positionable in multiple directions, such as in two-dimensional or three-dimensional space. The position manipulator 140 may be automatically adjusted, such as by a controller that controls an electric actuator to position the position manipulator 140 and the imaging device 106. The position manipulator 162 may be adjusted by another control module, such as an AI control module. The position manipulator 162 may be mounted to the frame of the machine 10, such as from below the platform 102, above the platform 102, at locations outside of the platform 102 or from inside the opening in the platform 102, when present. The position manipulator 162 may be supported by other structures around the machine 10. In other various embodiments, the position manipulator 140 may be manually adjusted. The position of the imaging device(s) 106 may be adjusted based on the types of parts 50 being imaged. For example, when a different type of part 50 is being imaged, the imaging device 106 may be moved based on the type of part being imaged. The auto focus module 120 may determine the proper imaging distance based on the type of part being imaged.

The sorting device 110 is positioned adjacent the platform 102. The sorting device 110 may be used to separate acceptable parts from defective parts based on input from the imaging device 106. Quality, high contrast images are used for inspecting the parts 50 based on the imaging device 106 being located at a proper working distance from the inspection zone. The high contrast images are used for training the vision inspection controller 108 using an AI learning module. In an exemplary embodiment, the sorting device 110 includes a robot arm 150 and a gripper 152 at a distal end 154 of the robot arm 150. In various embodiments, the robot arm 150 is a four-axis robot arm or a six-axis robot arm. Other types of robot arms 150 may be used in alternative embodiments. The parts 50 are picked off of the platform 102 by the gripper 152. The sorting device 110 is operated to remove the parts 50 from the platform 102, such as the acceptable parts and/or the defective parts. The parts 50 may be moved to collection bins, such as a first collection bin 156 for the acceptable parts and a second collection bin 158 for the defective parts. In various embodiments, the sorting device 110 is operated to remove all of the parts and place each of the parts in the corresponding collection bin 156, 158. In other various embodiments, the sorting device 110 is operated to remove only the acceptable parts to the first collection bin 156, leaving the defective parts to be dropped into the second collection bin 158 (located at the front 128 of the platform 102) as the parts 50 are advanced in the feed direction. In other various embodiments, the sorting device 110 is operated to remove only the defective parts to the second collection bin 158, leaving the acceptable parts to be dropped into the first collection bin 156 (located at the front 128 of the platform 102) as the parts 50 are advanced in the feed direction. Other types of part removal devices may be used in alternative embodiments, such as pushers, ejectors, and the like.

The vision inspection controller 108 is operably coupled to the imaging device 106 and the sorting device 110 for controlling operation of the sorting device 110. The imaging device 106 communicates with the vision inspection controller 108 through machine vision software to process the data, analyze results, record findings, and make decisions based on the information. The vision inspection controller 108 provides consistent and efficient inspection automation. The vision inspection controller 108 determines the quality of manufacture of the parts 50, such as determining if the parts 50 are acceptable or are defective. The vision inspection controller 108 identifies defects in the parts, when present. The auto focus module 120 of the vision inspection controller 108 determines the proper imaging distance for the imaging device 106. The vision inspection controller 108 controls operation of the sorting device 110 based on the identified orientation of the parts 50.

The vision inspection controller 108 receives the images from the imaging device 106 and processes the images to determine inspection results. In an exemplary embodiment, the vision inspection controller 108 includes one or more processors 180 for processing the images. The vision inspection controller 108 determines if each part 50 passes or fails inspection. The vision inspection controller 108 controls the sorting device 110 to remove the parts 50, such as the acceptable parts and/or the defective parts, into the collection bins 156, 158. Once the images are received, the images are processed based on an image analysis model. The images are compared to the image analysis model to determine if the part 50 has any defects. The image analysis model may be a three-dimensional model defining a baseline structure of the part being imaged. In other various embodiments, the image analysis model may be a series of two-dimensional models, such as for each imaging device 106. The image analysis model may be based on images of known or quality passed parts, such as during a learning or training process. The image analysis model may be based on the design specifications of the part 50. For example, the image analysis model may include design parameters for edges, surfaces, and features of the part. The image analysis model may include tolerance factors for the parameters, allowing offsets within the tolerance factors. During processing, the images may be individually processed or may be combined into a digital model of the part, which is then compared to the image analysis model. The images are processed based on the image analysis model to detect defects, such as short shot defects, flash defects, black dots, dirt, dents, scratches, or other types of defects. The images may be processed by performing pattern recognition of the images based on the image analysis model to compare patterns or features in the images to patterns or features in the image analysis model. The images may be processed by performing feature extraction of boundaries and surfaces detected in the images and comparing the boundaries and surfaces to the image analysis model. The vision inspection controller 108 may identify lines, edges, bridges, grooves, or other boundaries or surfaces within the image. The vision inspection controller 108 may perform contrast enhancement and or noise reduction of the images during processing. The vision inspection controller 108 may identify areas of interest within the image for enhanced processing. The vision inspection controller 108 may perform image segmentation during processing.

In an exemplary embodiment, the vision inspection controller 108 includes an artificial intelligence (AI) learning module 190. The AI learning module 190 uses artificial intelligence to train the vision inspection controller 108 and improve inspection accuracy of the vision inspection controller 108. Providing high quality images, such as by positioning the imaging device 106 at the proper working distance, improves the training and learning of the AI learning module 190. The AI learning module 190 update image analysis model based on the images received from the imaging device 106. For example, the image analysis model may be customized and configured by the AI learning module 190. The images forming the basis of the image analysis model may be revised or updated based on images taken by the imaging devices 106, using the AI learning module 190. For example, the image analysis model may be based on multiple images, which are updated or expanded based on images from the AI learning module 190. As the AI learning module expands the image analysis model, the quality of the image processing may be improved. The vision inspection controller 108 is updated and trained in real time during operation of the vision inspection system 100. The AI learning module 190 of the vision inspection controller 108 may be operable in a learning mode to train the vision inspection controller 108 and develop the image analysis model. The image analysis model changes over time based on input from the AI learning module 190 (for example, based on images of the parts 50 taken by the imaging device 106). The AI learning module 190 may be used to update the auto focus module 120. In alternative embodiments, the AI learning module 190 may be a separate module from the vision inspection controller 108 independently operable from the vision inspection controller 108. For example, the AI learning module 190 may be separately coupled to the imaging devices 106 or other components of the machine 10.

In an exemplary embodiment, the vision inspection controller 108 includes a user interface 192. The user interface 192 includes a display 194, such as a monitor. The user interface 192 includes one or more inputs 196, such as a keyboard, a mouse, buttons, and the like. An operator is able to interact with the vision inspection controller 108 with the user interface 192.

Figure 2:
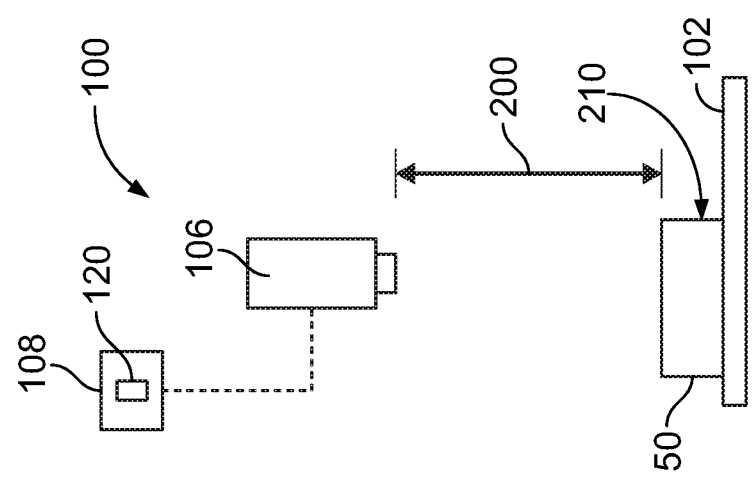
FIG. 2 is a side view of a portion of the vision inspection system 100 showing the imaging device 106 relative to the part 50 on the platform 102.

FIG. 2 is a side view of a portion of the vision inspection system 100 showing the imaging device 106 relative to the part 50 on the platform 102. The imaging device 106 is shown at a first working distance 200. The imaging device 106 is operably coupled to the vision inspection controller 108. The vision inspection controller 108 receives the images from the imaging device 106 and processes the images. The auto focus module 120 is used to determine the clarity of the images by calculating an image contrast score of the pixel values of the images at the first working distance 200.

Figure 3:
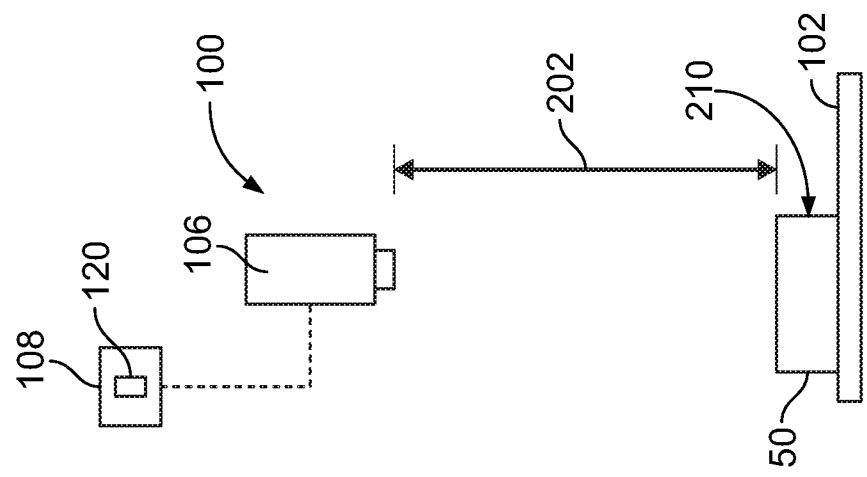
FIG. 3 is a side view of a portion of the vision inspection system 100 showing the imaging device 106 relative to the part 50 on the platform 102.

FIG. 3 is a side view of a portion of the vision inspection system 100 showing the imaging device 106 relative to the part 50 on the platform 102. The imaging device 106 is shown at a second working distance 202. The imaging device 106 is operably coupled to the vision inspection controller 108. The vision inspection controller 108 receives the images from the imaging device 106 and processes the images. The auto focus module 120 is used to determine the clarity of the images by calculating an image contrast score of the pixel values of the images at the second working distance 202.

Figure 4:
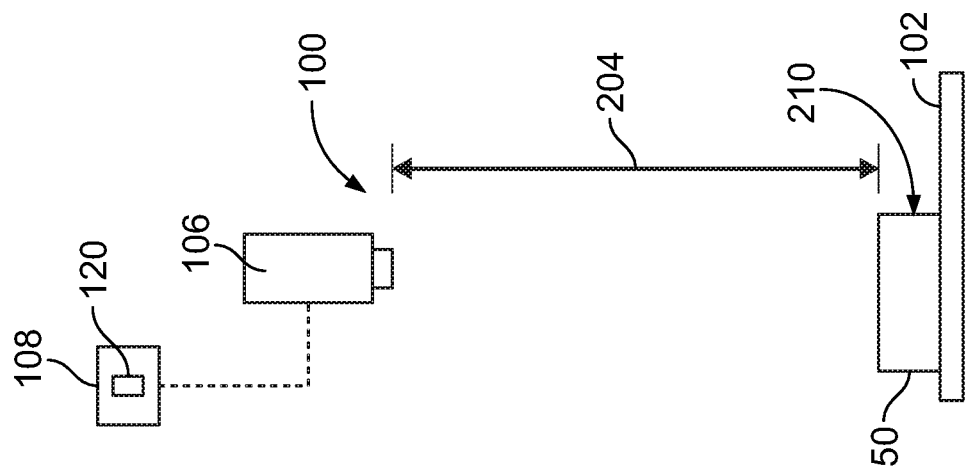
FIG. 4 is a side view of a portion of the vision inspection system 100 showing the imaging device 106 relative to the part 50 on the platform 102.

FIG. 4 is a side view of a portion of the vision inspection system 100 showing the imaging device 106 relative to the part 50 on the platform 102. The imaging device 106 is shown at a third working distance 204. The imaging device 106 is operably coupled to the vision inspection controller 108. The vision inspection controller 108 receives the images from the imaging device 106 and processes the images. The auto focus module 120 is used to determine the clarity of the images by calculating an image contrast score of the pixel values of the images at the third working distance 204.

With reference to FIGS. 2-4, the vision inspection controller 108 may be operable in a calibration mode to determine a proper imaging distance for the imaging device 106 based on the clarity of the images at the various working distances 200, 202, 204. The vision inspection controller 108 uses the auto focus module 120 to determine the proper imaging distance. In an exemplary embodiment, the auto focus module 120 includes one or more processors configured to move the imaging device 106 to the first working distance 200 (FIG. 2) from an inspection zone 210, one or more processors configured to capture a first image at the first working distance 200, and one or more processors configured to calculate a first image contrast score of pixel values of the first image. The auto focus module 120 includes one or more processors configured to move the imaging device 106 to the second working distance 202 (FIG. 3) from the inspection zone 210, one or more processors configured to capture a second image at the second working distance 202, and one or more processors configured to calculate a second image contrast score of pixel values of the second image. The auto focus module 120 includes one or more processors configured to move the imaging device 106 to the third working distance 204 (FIG. 4) from the inspection zone 210, one or more processors configured to capture a third image at the third working distance 204, and one or more processors configured to calculate a third image contrast score of pixel values of the third image.

In an exemplary embodiment, the imaging device 106 may capture color images, such as using a red/green/blue (RGB) additive primary color model. The auto focus module 120 may include one or more processors configured to converting the RGB images to grayscale images. The image contrast scores may be calculated based on the grayscale images. In an exemplary embodiment, the auto focus module 120 may calculate the image contrast scores by calculating an absolute difference between the pixel values of the images. The auto focus module 120 may calculate the image contrast scores by calculating a sum of squared difference (SSD) of the pixel values for the images. The pixel values may be a matrix of pixel values, such as a 3×3 matrix of pixel values having values of:

$$\begin{pmatrix} A_{n,m} & B_{n,m+1} & C_{n,m+2} \\ D_{n+1,m} & E_{n+1,m+1} & F_{n+1,m+2} \\ G_{n+2,m} & H_{n+2,m+1} & I_{n+2,m+2} \end{pmatrix}$$

The auto focus module 120 may calculate the SSD using the formula:

$$(A_{n,m}-B_{n,m+1})^2+(B_{n,m+1}-C_{n,m+2})^2+(D_{n+1,m}-E_{n+1,m+1})^2+(E_{n+1,m+1}-F_{n+1,m+2})^2+(G_{n+2,m}-H_{n+2,m+1})^2+(H_{n+2,m+1}-I_{n+2,m+2})^2.$$

The auto focus module 120 includes one or more processors configured to compare the image contrast scores to determine which has a higher image contrast score. The vision inspection controller 108 provides an output, such as to the display 194 and/or to the position manipulator 140 to operate the imaging device 106 at the imaging working distance equal to the working distance associated with the higher image contrast score to image the parts 50. The AI learning module 190 may be used to update the auto focus module 120. For example, images processed by the AI learning module 192 are used to update the auto focus module 120.

Figure 5:
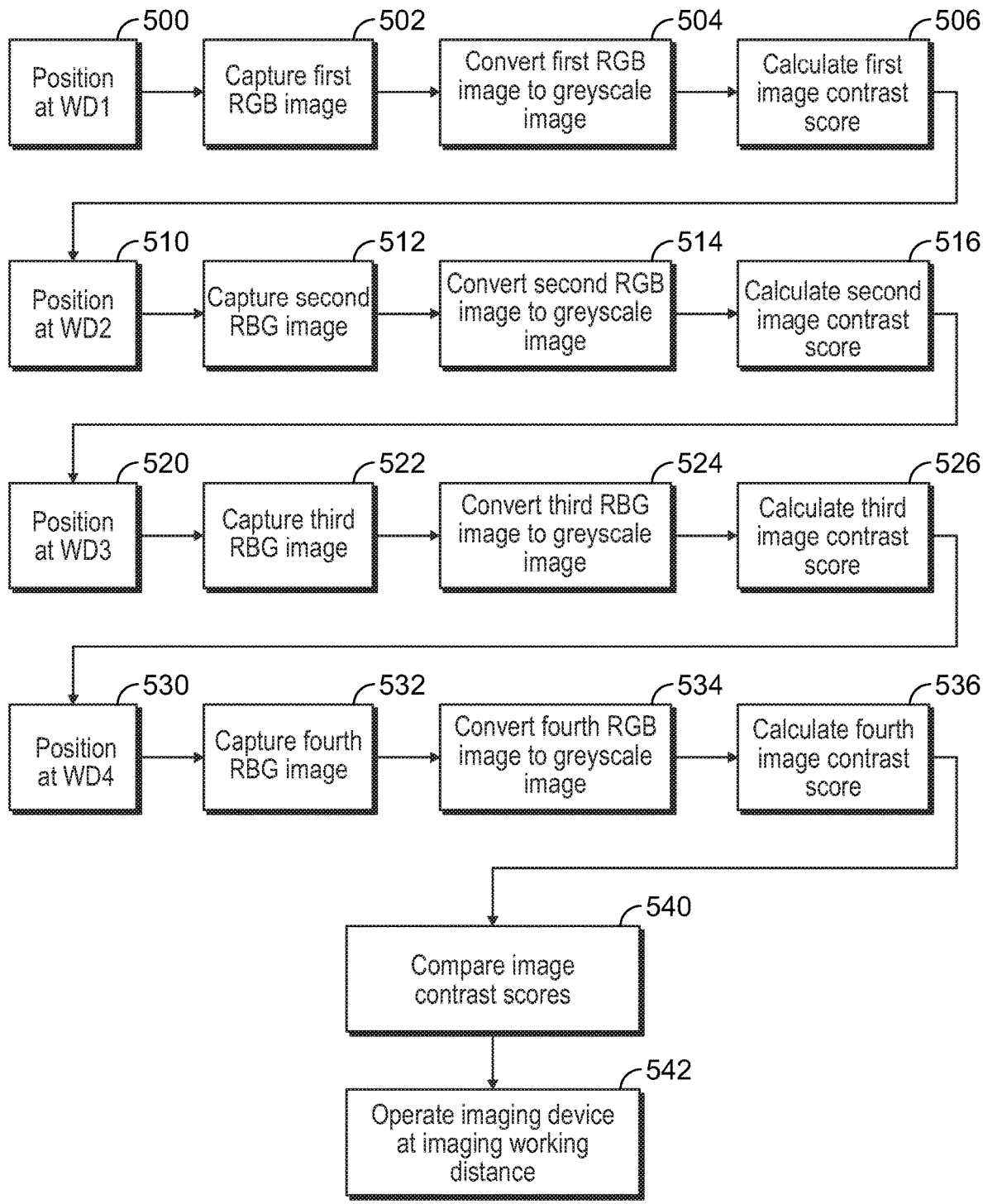
FIG. 5 is a flow chart of a method of inspecting the parts 50 in accordance with an exemplary embodiment.

FIG. 5 is a flow chart of a method of inspecting the parts 50 in accordance with an exemplary embodiment. The method, at 500, includes positioning the imaging device 106 at a first working distance (WD1) from the inspection zone. The method, at 502, includes capturing a first RGB image (M×N×3). The first RGB image includes an M row by N column matrix, having red, green and blue values. The RGB image is a true color matrix where the first two indexes (M, N) are the coordinates of the pixel and the third index is the color component. For example, (M,N,1) is the red pixel value, (M,N,2) is the green, and (M,N,3) is the blue component. The method, at 504, includes converting the first RGB image to a first greyscale image (M×N×1, where the first two indexes (M, N) are the coordinates of the pixel and the third index represents a monochrome or greyscale intensity component ranging from black to white). The greyscale image has a matrix (M×N) of pixel values. The method, at 506, includes calculating a first image contrast score of pixel values for the first greyscale image at the first working distance. The image contrast score may be calculated by calculating an absolute difference between the pixel values of the images. The image contrast score may be calculated by calculating a sum of squared difference (SSD) of the pixel values for the images. After the first image contrast score is determined, the system triggers for a new imaging position.

The method, at 510, includes positioning the imaging device 106 at a second working distance (WD2) from the inspection zone. The second working distance WD2 is located at a spacing (S) from the first working distance (WD1+S). The method, at 512, includes capturing a second RGB image (M×N×3). The RGB image has a matrix (M×N) of red pixel values, a matrix (M×N) of green pixel values, and a matrix (M×N) of blue pixel values. The method, at 514, includes converting the second RGB image to a second greyscale image (M×N×1). The greyscale image has a matrix (M×N) of pixel values, such as a 3×3 matrix of pixel values. The method, at 516, includes calculating a second image contrast score of pixel values for the second greyscale image at the second working distance WD2. The second image contrast score may be calculated by calculating an absolute difference between the pixel values of the images. The second image contrast score may be calculated by calculating the SSD of the pixel values for the images. After the second image contrast score is determined, the system triggers for a new imaging position.

The method, at 520, includes positioning the imaging device 106 at a third working distance WD3 from the inspection zone. The third working distance is located at a spacing (S) from the second working distance WD2 (WD2+S or WD1+S+S). The third working distance WD3 from the inspection zone is located the first working distance 1S and another spacing 1S from the second working distance to the third working distance (for example, 1S+1S=2S) The spacings may be different in alternative embodiments. The method, at 522, includes capturing a third RGB image (M×N×3). The RGB image has a matrix (M×N) of red pixel values, a matrix (M×N) of green pixel values, and a matrix (M×N) of blue pixel values. The method, at 524, includes converting the third RGB image to a third greyscale image (M×N×1). The greyscale image has a matrix (M×N) of pixel values, such as a 3×3 matrix of pixel values. The method, at 526, includes calculating a third image contrast score of pixel values for the third greyscale image at the third working distance WD3. The third image contrast score may be calculated by calculating an absolute difference between the pixel values of the images. The third image contrast score may be calculated by calculating the SSD of the pixel values for the images. After the third image contrast score is determined, the system triggers for a new imaging position.

The method, at 530, includes positioning the imaging device 106 at an $n^{th}$ working distance WD4 from the inspection zone. The $n^{th}$ working distance is located at any distance beyond the third working distance by $n^{th}$ spacing (S). The WD4 may be a spacing S from the third working distance WD3 or any other spacing (for example, 2S, 3S or another multiple of the spacing S). The method, at 532, includes capturing an $n^{th}$ RGB image (M×N×3). The RGB image has a matrix (M×N) of red pixel values, a matrix (M×N) of green pixel values, and a matrix (M×N) of blue pixel values. The method, at 534, includes converting the $n^{th}$ RGB image to an $n^{th}$ greyscale image (M×N×1). The greyscale image has a matrix (M×N) of pixel values, such as a 3×3 matrix of pixel values. The method, at 536, includes calculating an $n^{th}$ image contrast score of pixel values for the $n^{th}$ greyscale image at the $n^{th}$ working distance. The $n^{th}$ image contrast score may be calculated by calculating an absolute difference between the pixel values of the images. The $n^{th}$ image contrast score may be calculated by calculating the SSD of the pixel values for the images.

The method, at 540, includes comparing the image contrast scores to determine which has a higher image contrast score value. The method, at 542, includes operating the imaging device 106 at an imaging working distance equal to the working distance associated with the higher image contrast score value to image the parts 50.

Figure 6:
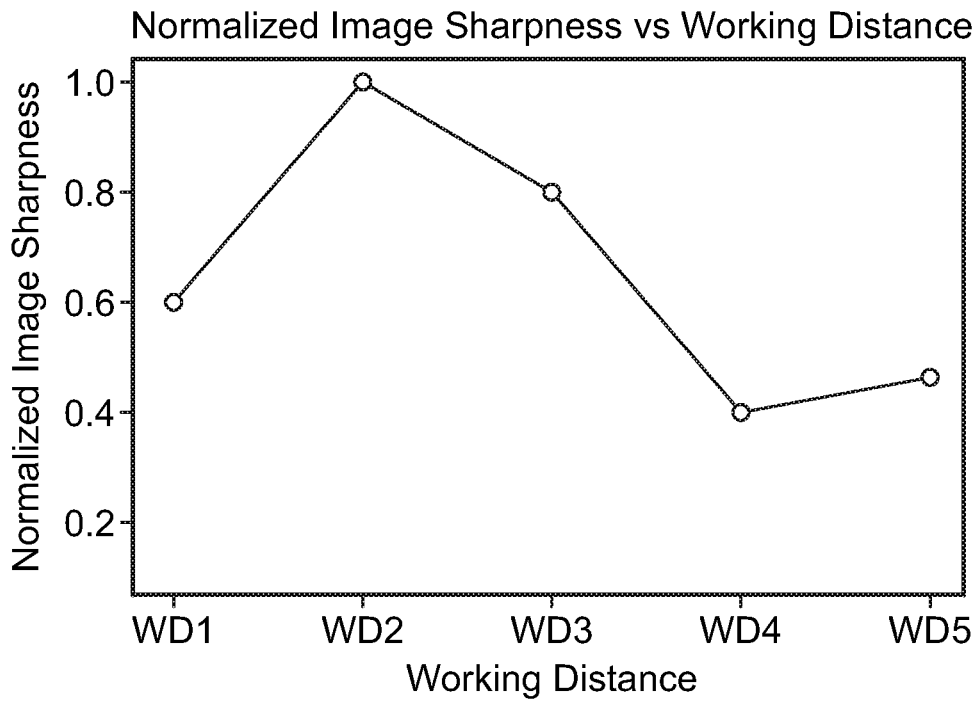
FIG. 6 is a chart showing image sharpness at various working distances in accordance with an exemplary embodiment.

FIG. 6 is a chart showing image sharpness at various working distances in accordance with an exemplary embodiment. The vision inspection controller 108 performs an auto focus process to determine an imaging working distance for the imaging device 106. In the illustrated embodiment, images are captured at five working distances (WD1, WD2, WD3, WD4, WD5). The vision inspection controller 108 is configured to calculate image contrast scores at each of the image working distances. In the illustrated embodiment, the image contrast scores are normalized. The vision inspection controller 108 determines which image contrast scores has the highest image contrast score value, which is the image contrast score associated with the second working distance (WD2) in the illustrated embodiment. The vision inspection controller 108 outputs the imaging working distance as corresponding with the working distance having the highest image contrast score. The vision inspection controller 108 causes the imaging device 106 to operate at the working distance associated with the highest image contrast score value, namely WD2. For example, the vision inspection controller 108 adjusts the position manipulator 140 (FIG. 1) to position the imaging device 106 at the second working distance WD2. The controller 108 may operate control of an electric actuator, such as one or more servo motors, to control the position of the imaging device 106. The position manipulator 162 may be adjusted by another control module, such as the AI control module.

Figure 7:
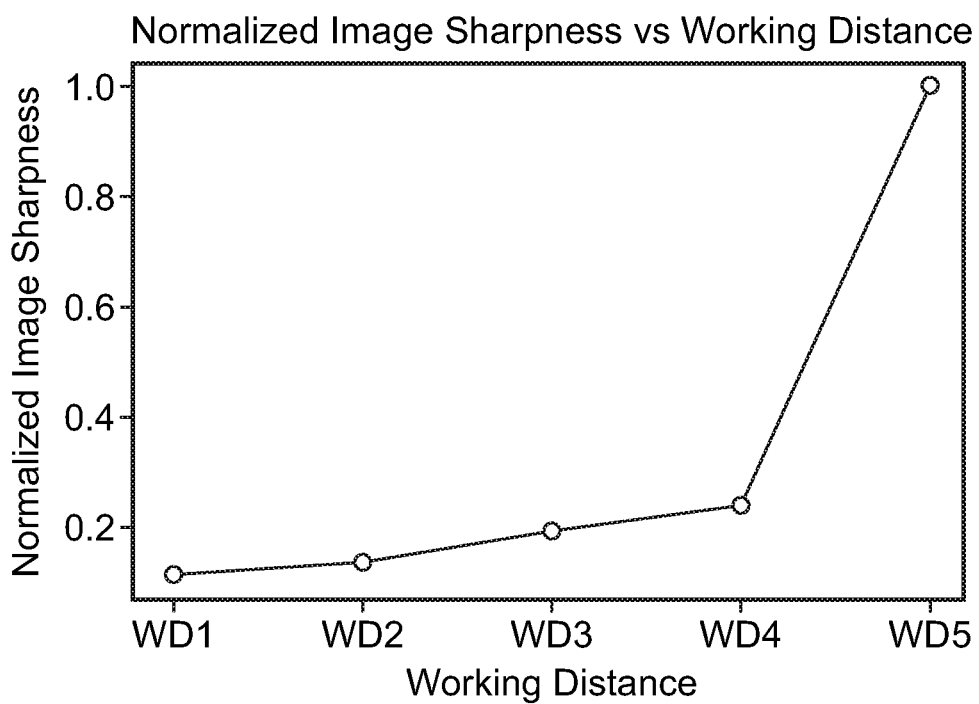
FIG. 7 is a chart showing image sharpness at various working distances in accordance with an exemplary embodiment.

FIG. 7 is a chart showing image sharpness at various working distances in accordance with an exemplary embodiment. The vision inspection controller 108 performs an auto focus process to determine an imaging working distance for the imaging device 106. In the illustrated embodiment, images are captured at five working distances (WD1, WD2, WD3, WD4, WD5). The vision inspection controller 108 is configured to calculate image contrast scores at each of the image working distances. In the illustrated embodiment, the image contrast scores are normalized. The vision inspection controller 108 determines which image contrast scores has the highest image contrast score value, which is the image contrast score associated with the fifth working distance (WD5) in the illustrated embodiment. The vision inspection controller 108 outputs the imaging working distance as corresponding with the working distance having the highest image contrast score. The vision inspection controller 108 causes the imaging device 106 to operate at the working distance associated with the highest image contrast score value, namely WD5. In various embodiments, the vision inspection controller 108 may continue to perform the auto focus process since the last imaging position corresponds to the highest image contrast score to determine if a working distance even further than WD5 has a higher image contrast score. The vision inspection controller 108 may adjust the position manipulator 140 (FIG. 1) to position the imaging device 106 at the appropriate working distance based on the imaged working distances. The controller 108 may operate control of an electric actuator, such as one or more servo motors, to control the position of the imaging device 106. The position manipulator 162 may be adjusted by another control module, such as the AI control module. In various embodiments, if the image at the sixth working distance has a lower image contrast score, then the vision inspection controller 108 has determined the working distance corresponding to the highest image contrast score. For example, such curve may be a polynomial graph, such as a quadratic curve (for example, a parabola) having a local maximum. The vision inspection controller 108 compares the images at each of the working distances to adjust the position manipulator 140 to position the imaging device 106 at the appropriate working distance.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A vision inspection system comprising:
a platform supporting parts for inspection at an inspection zone, wherein the parts include a first subset of parts and a second subset of parts;
an inspection station positioned adjacent the platform at the inspection zone, the inspection station including an imaging device to image the parts on the platform, wherein the first and second subsets of parts are imaged at different times, the first subset of parts being imaged during a calibration mode, the second subset of parts being imaged during a normal operation mode; and
a vision inspection controller receiving images from the imaging device, the vision inspection controller including an auto focus module for orienting the imaging device relative to the inspection zone, the auto focus module determining a working distance for the imaging device from the inspection zone, the auto focus module calculating an image contrast score of pixel values of the images at various working distances from the inspection zone, the vision inspection controller imaging the first subset of parts at the various working distances to calculate the image contrast scores at the various working distances, the vision inspection controller causing the inspection station to operate the imaging device at an imaging working distance corresponding to the working distance associated with the highest image contrast score, wherein the second subset of parts is performed only at the determined imaging working distance.

2. The vision inspection system of claim 1, wherein the auto focus module converts the images to grayscale images and calculates the image contrast score based on the pixel values of the grayscale image.

3. The vision inspection system of claim 1, wherein the vision inspection controller causes the imaging device to image the inspection zone at at least three positions at corresponding working distances from the inspection zone.

4. The vision inspection system of claim 3, wherein the imaging positions include a first position, a second position, and a third position, the second position being located a first spacing from the first position, the third position being located at a second spacing from the second position, the first spacing being equal to the second spacing.

5. The vision inspection system of claim 1, wherein the image contrast score is determined based on a sum of squared difference (SSD) of the pixel values of the images.

6. The vision inspection system of claim 1, wherein the image contrast score is calculated as an absolute difference between the pixel values of the images.

7. The vision inspection system of claim 1, wherein each image includes a 3×3 matrix of pixel values, the auto focus module calculating a sum of squared difference (SSD) of the 3×3 matrix of pixel values.

8. The vision inspection system of claim 1, wherein the images have pixel values given as:

$$\begin{pmatrix} A_{n,m} & B_{n,m+1} & C_{n,m+2} \\ D_{n+1,m} & E_{n+1,m+1} & F_{n+1,m+2} \\ G_{n+2,m} & H_{n+2,m+1} & I_{n+2,m+2} \end{pmatrix}$$

and wherein the auto focus module calculates a sum of squared difference (SSD) of the pixel values using the equation:

$$(A_{n,m}-B_{n,m+1})^2+(B_{n,m+1}-C_{n,m+2})^2+(D_{n+1,m}-E_{n+1,m+1})^2 \\ +(E_{n+1,m+1}-F_{n+1,m+2})^2+(G_{n+2,m}-H_{n+2,m+1})^2+ \\ (H_{n+2,m+1}-I_{n+2,m+2})^2.$$

9. The vision inspection system of claim 1, wherein the inspection station includes an imaging device locator positioning the imaging device relative to the inspection zone, the imaging device locator automatically moving the imaging device to the varying working distances and the imaging working distance.

10. The vision inspection system of claim 1, wherein the vision inspection controller includes an artificial intelligence learning module operated to update imaging of the parts based on the images received from the imaging device and based on inputs from the auto focus module.

11. A vision inspection system comprising:
a platform supporting parts for inspection at an inspection zone, wherein the parts include a first subset of parts and a second subset of parts;
an inspection station positioned adjacent the platform, the inspection station including an imaging device to image the parts on the platform, wherein the first and second subsets of parts are imaged at different times, the first subset of parts being imaged during a calibration mode, the second subset of parts being imaged during a normal operation mode; and
a vision inspection controller receiving images from the imaging device, the vision inspection controller including an auto focus module for orienting the imaging device relative to the inspection zone, the auto focus module comprising:
one or more processors configured to move the imaging device to a first working distance from the inspection zone;
one or more processors configured to capture a first image of one of the parts in the first subset of parts at the first working distance;
one or more processors configured to calculate a first image contrast score of pixel values of the first image;
one or more processors configured to move the imaging device to a second working distance from the inspection zone;
one or more processors configured to capture a second image of one of the parts in the first subset of parts at the second working distance;
one or more processors configured to calculate a second image contrast score of pixel values of the second image; and
one or more processors configured to compare the first image contrast score and the second image contrast score to determine which has a higher image contrast score; and
wherein the inspection station operates the imaging device at an imaging working distance equal to the working distance associated with the higher image contrast score to image the second subset of the parts only at the imaging working distance after the imaging working distance is determined.

12. The vision inspection system of claim 11, wherein the one or more processors configured to calculate the first image contrast score are configured to calculate an absolute difference between the pixel values of the first image, and wherein the one or more processors configured to calculate the second image contrast score are configured to calculate an absolute difference between the pixel values of the second image.

13. The vision inspection system of claim 11, wherein the one or more processors configured to calculate the first image contrast score are configured to calculate a first sum of squared difference (SSD) of the pixel values of the first image, and wherein the one or more processors configured to calculate the second image contrast score are configured to calculate a second SSD of the pixel values of the second image.

14. The vision inspection system of claim 13, wherein the first and second SSDs are calculated using the formula:

$$(A_{n,m}-B_{n,m+1})^2+(B_{n,m+1}-C_{n,m+2})^2+(D_{n+1,m}-E_{n+1,m+1})^2 \\ +(E_{n+1,m+1}-F_{n+1,m+2})^2+(G_{n+2,m}-H_{n+2,m+1})^2+ \\ (H_{n+2,m+1}-I_{n+2,m+2})^2$$

based on a matrix of pixel values of:

$$\begin{pmatrix} A_{n,m} & B_{n,m+1} & C_{n,m+2} \\ D_{n+1,m} & E_{n+1,m+1} & F_{n+1,m+2} \\ G_{n+2,m} & H_{n+2,m+1} & I_{n+2,m+2} \end{pmatrix}.$$

15. The vision inspection system of claim 11, wherein the one or more processors configured to capture the first image are configured to capture a first RGB image, the auto focus module further comprising one or more processors configured to converting the first RGB image to a first grayscale image, the one or more processors configured to calculate the first image contrast score are configured to calculate the first image contrast score of the first grayscale image, and wherein the one or more processors configured to capture the second image are configured to capture a second RGB image, the auto focus module further comprising one or more processors configured to converting the second RGB image to a second grayscale image, the one or more processors configured to calculate the second image contrast score are configured to calculate the second image contrast score of the second grayscale image.

16. A method of inspecting parts including a first subset of parts and a second subset of parts imaged at different times, the first subset of parts being imaged during a calibration mode, the second subset of parts being imaged during a normal operation mode, the method comprising:
moving an imaging device to a first working distance from an inspection zone;
capturing a first image of one of the parts in the first subset of parts at the first working distance;
calculating a first image contrast score of pixel values of the first image;
moving the imaging device to a second working distance from the inspection zone;
capturing a second image of one of the parts in the first subset of parts at the second working distance;
calculating a second image contrast score of pixel values of the second image;
comparing the first image contrast score and the second image contrast score to determine which has a higher image contrast score value; and
operating the imaging device at an imaging working distance equal to the working distance associated with the higher image contrast score value to image the second subset of the parts only at the imaging working distance after the imaging working distance is determined.

17. The method of claim 16, wherein said calculating the first image contrast score comprises calculating an absolute difference between the pixel values of the first image, and wherein said calculating the second image contrast score comprises calculating an absolute difference between the pixel values of the second image.

18. The method of claim 16, wherein said calculating the first image contrast score comprises calculating a first sum of squared difference (SSD) of the pixel values of the first image, and wherein said calculating the second image contrast score comprises calculating a second SSD of the pixel values of the second image.

19. The method of claim 18, wherein the first and second SSDs are calculated using the formula:

$$(A_{n,m}-B_{n,m+1})^2+(B_{n,m+1}-C_{n,m+2})^2+(D_{n+1,m}-E_{n+1,m+1})^2$$
$$+(E_{n+1,m+1}-F_{n+1,m+2})^2+(G_{n+2,m}-H_{n+2,m+1})^2+$$
$$(H_{n+2,m+1}-I_{n+2,m+2})^2$$

based on a matrix of pixel values of:

$$\begin{pmatrix} A_{n,m} & B_{n,m+1} & C_{n,m+2} \\ D_{n+1,m} & E_{n+1,m+1} & F_{n+1,m+2} \\ G_{n+2,m} & H_{n+2,m+1} & I_{n+2,m+2} \end{pmatrix}.$$

20. The method of claim 16, wherein said capturing the first image comprises capturing a first RGB image, the method further comprising converting the first RGB image to a first grayscale image, said calculating the image contrast score comprises calculating the first image contrast score of the first grayscale image, and wherein said capturing the second image comprises capturing a second RGB image, the method further comprising converting the second RGB image to a second grayscale image, said calculating the image contrast score comprises calculating the second image contrast score of the second grayscale image.

\* \* \* \* \*